3,539,318
APPARATUS FOR PRODUCING FIBERS
Hellmut I. Glaser, Newark, and Michael S. Mitcham, Granville, Ohio, assignor to Owens-Corning Fiberglas Corporation, a corporation of Delaware
Filed Nov. 24, 1967, Ser. No. 685,663
Int. Cl. C03b 37/02
U.S. Cl. 65—11            9 Claims

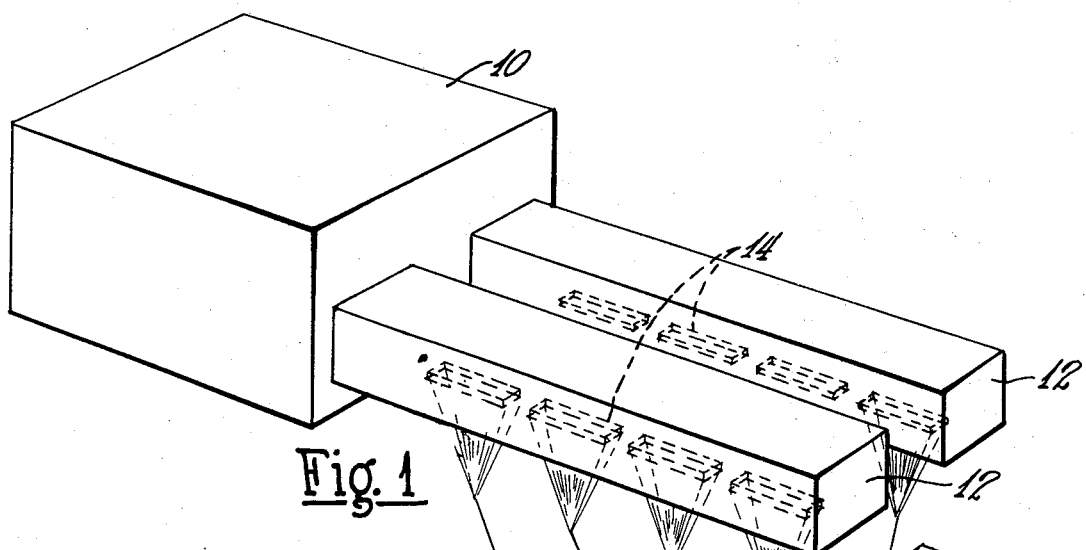
Fig. 1
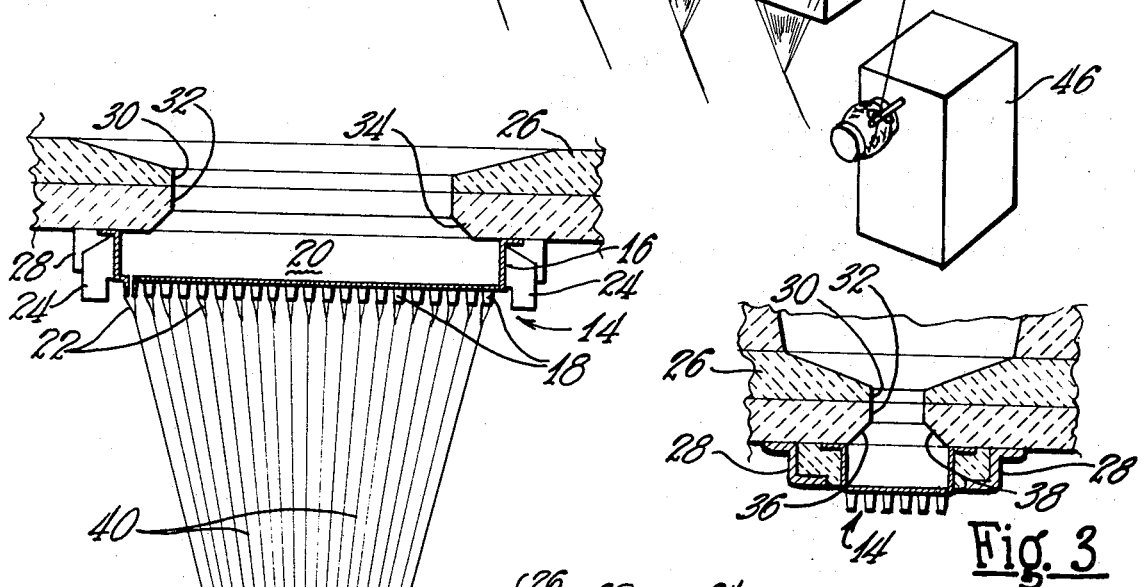
Fig. 2
Fig. 3
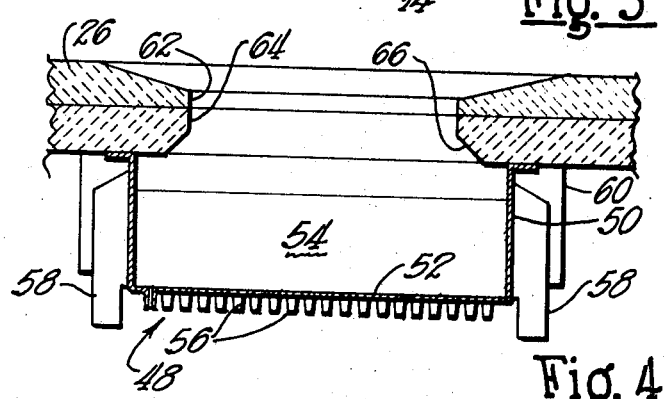
Fig. 4
INVENTORS
HELLMUT I. GLASER &
MICHAEL S. MITCHAM
BY
Staelin & Overman
ATTORNEYS

United States Patent Office 3,539,318
Patented Nov. 10, 1970

ABSTRACT OF THE DISCLOSURE

Openings along the bottom of a forehearth communicate with a plurality of bushings therebelow, with the openings having ends which flare outwardly and downwardly. The flared arrangement of the ends of the openings has been found to increase the uniformity of the temperature of the glass over the length of the bushing tip sections and thereby produce more uniform fibers with less interruptions in operation due to filament break-outs. The opening design according to the invention has been found to be particularly effective for bushings of the high through-put type and also for bushings producing very fine filaments.

---

This invention relates to apparatus for producing fibers and more particularly to the design of an opening between a forehearth and bushing which improves the bushing operation and the quality of the fibrous product.

A common system for producing glass filament or fibers includes a glass melting furnace having forehearths extending therefrom through which molten glass is carried to a plurality of bushings located along the forehearths and therebelow. The forehearths can extend directly from the furnace or can extend as branches from one or more main channels carrying the glass from the furnace. The glass from each forehearth flows by gravity into the bushings therebelow, with the glass subsequently being attenuated through bushing tips into glass filaments or fibers. When the glass reaches the bushings, heat may be added thereto by electrical heating of the bushing tip sections, or the glass may be allowed to cool further before being attenuated into fibers, depending on the temperature of the glass entering the bushings and on the rate of flow therethrough. In other bushings, having lower throughputs, heat is always added to the glass at the bushing tip sections.

The openings in the bottom of the forehearth channel, which connect the channel and the bushings, usually are smaller in size than the glass-receiving chambers and tip sections of the bushings. This relationship exists for two reasons. In bushings having relatively low through-puts where a substantial amount of heat is added to the glass in the bushings, the openings are small in order to minimize the transfer of heat from glass in the bushings to the glass thereabove in the forehearth which flows down the forehearth channels to the subsequent bushings located therealong. Such transfer of heat tends to disrupt the heat balance of the overall system and, therefore, it is desirable to keep the transfer to a minimum by maintaining the openings small. In other instances, there has been a trend toward larger bushings with a larger number of bushing tips. Where such bushings are used with existing furnaces and forehearths, the supporting structure of the forehearths often render it impossible to increase the size of the glass supply openings in the bottom of the forehearth. Consequently, the openings for the glass are frequently smaller than the glass-receiving chambers and tip sections of the bushings because of existing physical limitations.

Regardless of the reason, the above condition results in non-uniformity in the temperature of the glass along the length of the bushing which results in fibers or filaments of non-uniform physical characteristics and also results in more interruptions in bushing operation due to break-out of the filaments. In a high through-put bushing, for example, which is relatively shallow and produces from sixty to ninety pounds per hour of glass filaments, the bushing tip section can be heated electrically, but whether or not heat is supplied to the glass in the bushing through this means depends on the particular conditions and the temperature of the glass entering the bushing from the forehearth. Where heat is supplied to the glass through the bushing tip section, it has been found with conventional systems employing relatively small glass supply openings that the glass at the ends of the bushing tip section tends to be at a higher temperature than that in the intermediate portions. When no heat is added so that the glass cools as it moves downwardly in the bushing, the glass at the ends of the bushing tip section will be colder than the glass in the center.

It has also been found that with bushings producing very fine filaments, the glass at the ends of the bushing tip sections will be hotter than the glass in the center, with considerable heat being added to the glass through the bushing tip sections.

In accordance with the invention, it has been found that the temperature uniformity of the glass can be substantially increased by flaring portions of the end surfaces of the glass supply opening in the bottom of the forehearth channel so as to flare outwardly in a downward direction. This apparently gives the glass moving to the end portions of the tip section a more direct, shorter path and is relatively less stagnant, with more uniform, laminar flow being achieved. The glass at the end portions therefore has less time in which it is subjected to the heat of the bushing tip section, if such is being heated at the time, or is subjected less to heat loss through the sidewalls and bottom of the bushing if the glass is allowed to cool as it moves downwardly. Further, by flaring the ends of the opening, the glass does not move around a corner so as to be shielded from adjacent portions of the glass. Consequently, the glass can "see" more of the other glass as it moves downwardly and temperature differentials are thereby reduced through direct radiation in the glass from one portion to another. In any event, the temperature of the glass along the length of the bushing tip section is substantially more uniform by incorporating the invention into the fiber-forming apparatus. The flared lower edges of the opening also reduce wear and the possibility of "stones" in the glass, as well as the possibility of gas pockets in the bushing.

With very shallow, high through-put bushings, the longitudinal edges of the opening, as well as the ends, can be flared outwardly and downwardly with equal efficacy.

It is, therefore, a principal object of the invention to improve the operation of a bushing from which filaments are formed.

Another object of the inevniton is to provide a combination foreheath and bushing with the temperature of the glass at the bushing tip section being more uniform over its length.

Numerous other objetcs and advantages of the invention will be apparent from the following detailed description of preferred embodiments thereof, reference being made to the accompanying drawings, in which:

FIG. 1 is a schematic view in perspective of a melting furnace, forehearths, and bushings constituting a fiber-forming system embodying the invention;

FIG. 2 is an enlarged view in vertical, longitudinal cross section showing one of the bushings of FIG. 1;

FIG. 3 is a view in tranverse cross section taken along the line 3—3 of FIG. 2; and FIG. 4 is a view in longitudinal cross section of a modified bushing and glass supply opening thereabove.

Referring to FIG. 1, the overall fiber forming system includes a glass melting furnace or tank 10 having, in this instance, two forehearths 12 extending therefrom, each forehearth having a plurality of bushings 14 located therebelow and extending longitudinally thereof.

Referring particularly to FIGS. 2 and 3, the bushing 14 shown is of a shallow, high through-put design with glass attenuated into fibers at the rate of sixty to ninety pounds per hour, for example. The bushing 14 includes platinum side and end walls 16 and a bushing tip section 18 which form a glass-receiving chamber 20. A multiplicity of bushing tips 22 of a suitable, known design forms part of the bushing tip section 18, with the bushing and particularly the bushing tip section being electrically heated through terminals 24 located at the ends of the bushing. However, particularly with a high through-put bushing, the bushing tip section may not be heated at all in many instances.

The bushing 14 is supported under a bottom wall 26 of the forehearth 12 in communication with a glass supply opening 30 by suitable structural members 28. The glass supply openings 30 can be of a rectangular configuration similar to the glass-receiving chamber 20 but substantially shorter than the chamber. By way of example, the opening 30 can have a length of twelve inches and the chamber 20 a longth of sixteen inches. Because of physical limitations in the structure forming the existing furnace forehearths 12, the openings 30 cannot be made longer. Likewise, because of the desirability of a given output and a particular number of bushing tips 22, the chamber 20 cannot be made shorter. Consequently, the glass flowing through the opening 30 to the end portions of the bushing tip section 18 tends to have a longer path in which to travel and this was particularly true with the conventional glass supply openings heretofore employed having square lower edges at both ends and the sides. This long path decreased the uniformity of flow through the bushing, laminar flow being desired, particularly in a high through-put bushing, to maintain temperature uniformity and increase fiber quality, as well as to reduce the number of break-outs and downtime for the bushing.

In accordance with the invention, it has been discovered that by flaring the ends of the opening 30 and producing flared downwardly and outwardly extending portions 32 and 34, the flow through the bushing 14 can be substantially lamellar and will produce more uniform temperatures of the glass over the length of the tip section 18. As shown, the flared portions 32 and 34 preferably are designed so that they are in alignment with the ends of the tip section 18 or with points thereabove, if possible. With this arrangement, the glass flowing through the bushing will be closer to a uniform, lamellar condition and the glass in the corner portions of the bushing will "see" glass around it more fully and particularly the glass thereabove flowing through the opening 30. Heat transfer from one portion of the glass to another will thereby be achieved more effectively and temperature uniformity further improved. The flared edges also reduce wear of the refractory material forming the opening and the possibility of small pieces of the refractory, called "stones," from breaking away and entering the molten glass. Such stones can block the bushing tips and cause break-outs of the filaments. Formation of gas pockets in the upper portion of the bushing also is reduced.

Particularly for very shallow, high through-put bushings, the longitudinal edges of the opening 30 also can be flared (FIG. 3) to produce flared surface portions 36 and 38 which enable the glass to flow more uniformly toward the sides of the bushing. As shown, all of the upper edges of the opening 30 can also be flared to facilitate flow of glass downwardly.

The glass flowing through the opening 30 and through the bushing tip section 18 is attenuated into filaments 40 and led over a size applicator 42 and a gathering shoe 44 by a winder 46 (FIG. 1), as is known in the art. It will be appreciated that since the attenuation of the glass into the filaments depends on the glass temperature, the uniformity of the physical characteristics of the fibers as well as the efficacy with which the glass is drawn into fibers will be improved by the resulting temperature uniformity achieved with the invention.

Referring to FIG. 4, a modified bushing 48 is shown in longitudinal cross section. This bushing also has platinum walls 50 and a bushing tip section 52 which form a glass-receiving chamber 54 that is substantially deeper than the corresponding chamber 20. The bushing 48 has bushing tips 56 which are electrically heated through end terminals 58. The bushing 48 is supported below the bottom wall 26 of the forehearth 12 by suitable structural members 60 with the glass flowing into the chamber 54 through an opening 62. The glass flowing through the bushing 48 moves at a much slower rate, twenty-five to forty-five pounds per hour, for example, than the glass flowing through the bushing 14. Heat is always added to the glass in the chamber 54 because of the slower flow and the greater depth of the bushing chamber and also because the glass being attenuated into the fine filaments must be at a temperature approximately 150° F. higher than the temperature of the glass in the chamber 20. Consequently, with the bushing 48, it is desirable to employ a small, both short and narrow, glass supply opening to minimize the transfer of heat from the chamber 54 to the glass flowing through the forehearth 12 thereabove. Such transfer of heat tends to upset the heat balance of the glass flowing through the forehearth toward the bushings downstream of the first ones. Because the opening 62 is substantially shorter than the bushing opening, the opening has flared end portions 64 and 66 to improve bushing operation. Without the flared portion 64 and 66, the glass has a longer path to the end portions of the tip section 52 and also tends to stagnate at the end portions of the chamber. Consequently, the glass, by the time it reaches the end portions of the tip section 52, is otherwise at a higher temperature than that in the central portions. Further, the corners ordinarily located at the bottom of the opening tend to isolate portions of the glass from other portions as they flow around the corners so that the glass is not in direct communication with other glass to the extent otherwise possible, which further reduces heat transfer from one portion of the glass to another and decreases temperature uniformity. The flared surfaces also reduce the possibility of stones and gas pockets.

Various modifications of the above described embodiments of the invention will be apparent to those skilled in the art, and it is to be understood that such modifications can be made without departing from the spirit and the tenor of the invention if they are within the spirit and the tenor of the accompanying claims.

We claim:

1. In combination, a melting furnace, means forming an elongate forehearth extending from said melting furnace and having a channel for carrying molten glass therealong from said furnace, a plurality of elongate openings in the bottom of said channel positioned longitudinally thereof and in general alignment with one another, an elongate bushing under each of said openings and communicating therewith, each of said bushings forming a glass-receiving chamber with a bushing tip section therebelow and with means for heating the bushing tip section, said glass-receiving chamber being longer than its corresponding channel opening, and each of said channel openings having ends with lower portions which flare outwardly in a downward direction.

2. The combination according to claim 1 wherein said flared ends of said opening are in general alignment with the ends of the bushing tip sections of said bushings.

3. The combination according to claim 1 wherein said bushings are of the shallow, high through-put type.

4. The combination according to claim 1 wherein said bushings are designed to form Beta fibers, being deep, with low through-put.

5. In combination, means forming a channel for molten glass and including a bottom wall, an elongate glass supply opening in the bottom wall, a bushing under said opening and communicating therewith, means for supporting said bushing below said bottom wall and in communication with said glass supply opening, said bushing forming a glass-receiving chamber with a bushing tip section therebelow, said glass-receiving chamber having an elongate shape in horizontal cross section and being larger in at least one transverse cross-sectional dimension than the corresponding dimension of said bottom wall opening, with the lower edges of said opening at the ends of said dimension flaring outwardly in a downward direction.

6. The combination according to claim 5 wherein said opening and said chamber are of rectangular shape in horizontal cross section.

7. In combination, means forming a channel for molten glass and including a bottom wall, a rectangular glass supply opening in the bottom wall, a bushing, and means for supporting said bushing below said bottom wall under said opening and in communication therewith, said bushing forming a glass-receiving chamber with a bushing tip section therebelow, said glass-receiving chamber having a shape generally similar to the shape of said glass supply opening in horizontal cross section, at least portions of the lower edges of said opening flaring outwardly in a downward direction.

8. In combination, a melting furnace, means forming an elongate forehearth extending from said melting furnace and having a channel for carrying molten glass therealong from said furnace, said channel including a bottom wall with an elongate opening therein, an elongate bushing supported under and in communication with said opening and forming an elongate glass-receiving chamber with an elongate bushing tip section therebelow, each of said bushing tip section and said glass-receiving chamber having a length exceeding the length of said bottom wall opening, with the lower end portions of said opening having surface portions flaring outwardly in a downward direction.

9. The combination according to claim 8 wherein said flaring surfaces are in alignment with points on end walls of said bushing above said bushing tip section.

References Cited
UNITED STATES PATENTS 3,028,442   4/1962   Glaser _____ 65—2 X
3,390,972   7/1968   Froberg _____ 65—1

S. LEON BASHORE, Primary Examiner

R. L. LINDSAY, JR., Assistant Examiner

U.S. Cl. X.R.

65—134, 347